United States Patent [19]

Byrd

[11] 4,180,442
[45] Dec. 25, 1979

[54] ELECTRODEPOSITION OF COATINGS ON METALS TO ENHANCE ADHESIVE BONDING

[75] Inventor: Norman R. Byrd, Villa Park, Calif.

[73] Assignee: McDonnell Douglas Corporation, Long Beach, Calif.

[21] Appl. No.: 915,319

[22] Filed: Jun. 14, 1978

[51] Int. Cl.$^2$ .......................... C25D 9/04; C25D 9/06
[52] U.S. Cl. .............................. 204/14 N; 204/181 R
[58] Field of Search ................ 204/14 R, 14 N, 56 R, 204/181 R

[56]  References Cited
U.S. PATENT DOCUMENTS

| | | | |
|---|---|---|---|
| 3,697,398 | 10/1972 | Wessling | 204/56 R |
| 3,720,589 | 3/1973 | Masunaga et al. | 204/14 N |
| 3,734,784 | 5/1973 | Bereday et al. | 204/14 R |
| 3,790,450 | 2/1974 | Bloch et al. | 204/14 N |
| 3,990,953 | 11/1976 | Austin | 204/14 N |

Primary Examiner—T. M. Tufariello
Attorney, Agent, or Firm—Max Geldin

[57] ABSTRACT

The invention is directed to the electrodeposition of a coating of an organic compound or polymer on a metal such as aluminum, and the formation of a chemical bond between the metal and the coating. In the method for electrolytically depositing such coating on the metal substrate, e.g. aluminum, the substrate is employed as the anode in a non-aqueous electrolyte containing a coating compound, preferably a carboxyl-substituted aminosilane such as γ-aminopropyltriethoxysilane, which has been reacted with any of various anhydrides such as phthalic, maleic, or succinic anhydride, and electrodepositing a coating on the metal substrate, the organic coating formed being chemically bonded to the substrate, thereby enhancing adhesive bonding to the metal substrate or enhancing spot weldability of such substrate, such coating being strongly bonded to the substrate and being corrosion resistant.

32 Claims, No Drawings

ELECTRODEPOSITION OF COATINGS ON METALS TO ENHANCE ADHESIVE BONDING

BACKGROUND OF THE INVENTION

This invention relates to the provision of a coating on a metal substrate such as aluminum to enhance adhesive bonding to such substrate, and is particularly directed to the electrolytic deposition of a coating, particularly an organic coating, on a metal substrate such as aluminum, to form a chemical bond between the coating and the substrate, and providing a film for adhesive bonding of the substrate to a structural member e.g. of an aircraft, or to permit the metal substrate to be spot welded.

Primary adhesive bonding is being considered for an increasing number of aircraft structural joints. Thus, in view of the higher risks involved in the use of bonded primary joints, a need exists for optimum bond strength, long life, and economical and energy conservative processes. Generally, metal surfaces, such as aluminum, may be phosphoric acid oxidized, and this oxide layer becomes involved in adhesive bonding via van der Waals forces and/or hydrogen bonding. However, a stronger bond, such as a chemical bond, is desired to prevent a consequent possibility of reduced adhesive strength and failure due to environmental factors, such as high humidity and temperature.

The adhesion of polymers (as adhesives) to metal substrates is, generally, a complex process. Usually, the metal surface has to be pretreated, and the adhesive has to have sufficient activity for the mating of the two to result in an optimum bond. Substrates, e.g. metals, have to be prepared for this union of such two dissimilar materials as a polymer and a metal by first cleaning and then etching the metal, and, as in the case of aluminum, by anodizing (oxidizing) or other surface treatment such as the so-called FPL etch, employing a solution of sodium dichromate in sulfuric acid. These treatments have the effect of increasing surface area in order to enhance mechanical interaction between the polymer and the metal substrate. However, an important criterion for bonding of the coating to the metal is the wettability of the surface of the metal, and this is related to surface energy. Where mechanical interactions alone between the metal and polymer coating are involved, due primarily to surface roughening, the resulting bond strength is relatively weak.

It is accordingly highly desirable to provide a metal substrate or surface with a coating, and having a strong bond between the coating and the metal, so that upon subsequent application of an adhesive to the coating, the weak link is not the bond between the adhesive and the metal, but rather the weak link would be the adhesive per se. The result would be a higher bond strength between the metal substrate such as aluminum and the part which is adhesively secured to the metal, via the adhesive.

Further, if a metal surface such as aluminum is anodized, according to present practice, for adhesive bonding, the resulting oxide formed provides too high a surface resistance for spot weldability. If such surface is deoxidized to make it spot weldable, it cannot be adhesive bonded according to present practice. It accordingly would be beneficial if a metal surface could be prepared so that it could be either spot welded or adhesively bonded, or both.

Exemplary of the prior art are the following patents:

U.S. Pat. No. 3,026,255 discloses a method of protecting an oxidized metal surface by dipping the object into a solution of a polymer containing carboxyl, sulfonic or phosphonate groups.

U.S. Pat. No. 3,672,972 discloses a method for improving the adhesive bond between an aluminum surface and other materials, by anodizing the aluminum substrate in an acidic electrolyte.

U.S. Pat. No. 3,790,450 discloses the deposition of an organic coating on a metal substrate, by electrochemically coating a metal substrate as the positive electrode of an electrochemical cell, utilizing a non-aqueous electrolyte comprising a lower aliphatic acid, an aromatic compound and a Group III-A halide. It appears that an ionic polymerization occurs on a platinum anode, requiring a relatively long period of up to about 15 hours to form a polymerized carbonaceous residue.

U.S. Pat. No. 3,734,784 discloses anodic oxidation of an aluminum surface to form an active hydrated amorphous layer of aluminum oxide, followed by treatment of the activated aluminum surface by immersion in an alcohol-water solution of an organic compound containing a functional group such as a carboxyl group which is reactive with the hydrate on the aluminum surface, to form a water-insoluble product at the surface which provides a chemical bond between the overlying organic film and the aluminum substrate.

U.S. Pat. No. 3,990,953 discloses formation of elemental silicon as a corrosion resistant coating, employing a non-aqueous electroplating solution containing a non-aqueous solvent solution of a silicon halide or haloid silane, wherein the silicon compound is decomposed in an electric field to deposit silicon on a cathodic metal surface.

One object of the present invention is the provision of a coating on a metal surface, such as aluminum, having a strong chemical bond to the metal substrate. Another object is the provision of procedure for electrolytically depositing a coating on a metal substrate such as aluminum to provide a true chemical bond between the coating and the metal substrate, and permitting the metal substrate to be either adhesively bonded to another member or to be spot welded. A still further object is the elimination of the anodization process, ordinarily employed in present practice, for adhesively bonding aluminum. Yet another object is the provision of procedure to induce an organic compound or polymer to form a coating having a covalent or electrovalent bond with a metal substrate such as aluminum, the organic compound or polymer having functional groups to provide bondability, corrosion resistance and protection against bond degradation by humidity.

SUMMARY OF THE INVENTION

The above objects and advantages are achieved according to the invention by electrolytically applying a chemically bonded coating to a metal, e.g. aluminum, surface, employing a non-aqueous solution of an organic compound or polymer. The organic compound or polymer has a strong chemical bond to the metal substrate, and also preferably has a functional group or groups capable of covalently bonding the coating to an adhesive. This chemical compound or coating, which preferably has functional groups attached for bonding to an adhesive, enables a total chemical bond to be formed between the metal substrate and the adhesive.

Thus, briefly, the present invention provides a process for enhancing adhesive bonding of a metal substrate and permitting spot welding thereof, which comprises passing an electric current through a non-aqueous electrolyte in which a metal substrate is the anode, the metal of said substrate being active and capable of forming an organometallic compound, said electrolyte containing an organic compound having a labile hydrogen, and capable of generating an anion during electrolysis, and an inert organic solvent for said compound, and electrodepositing a coating of said compound on said metal substrate wherein said anion is reacted with and is chemically bonded to the metal of said substrate.

Representative of, but not restricted to those compounds and polymers used to form an electrodeposited coating on a metal substrate according to the invention, are the various carboxyl-substituted aminosilanes. Thus, according to one preferred mode of practice according to the invention, the metal substrate is employed as the anode in a non-aqueous electrolyte which can contain any one or more of various carboxyl-substituted aminosilanes such as γ-aminopropyltriethoxysilane which has been reacted with any of various anhydrides such as phthalic, maleic, succinic, or styrene-maleic anhydride copolymer. Since the entire surface of the metal forms the anode, the complete surface thereof becomes coated with the electrodeposited organic compound or polymer. Since this is an electrolytic conversion rather than an electrostatic deposit, a chemical compound or bond is formed by combination of the charged ionic species of metal anode and carboxyl anion, forming an electrovalent or covalent bond. Subsequently, this chemically bonded coating or film on the surface of the metal substrate is employed as the surface upon which the adhesive will act and form an electrovalent or covalent bond. Such coating also permits spot weldability of the metal substrate through the coating. Thus, a single chemical treatment of a metal substrate according to the invention results in a treated surface which can be strongly adhesively bonded or which permits spot welding of the substrate.

According to the invention concept, a wide variety of organic compounds, either simple organic or polymeric can be deposited and chemically bonded to the metal surface. Carboxyl-substituted aminosilanes are particularly preferred since not only does the carboxyl group of such compounds form a chemical or electrovalent bond with the metal substrate, e.g. aluminum, on which the chemical compound is electrodeposited, but, in addition, the silicon atom at the other end of the molecule is capable of setting up a covalent bond with an adhesive such as an epoxy. In addition, the silicon atom can function to set up a hydrophobic barrier, thereby enhancing resistance to corrosion and humidity.

The coating commences to electrodeposit on the metal substrate almost immediately from a non-aqueous, e.g. dimethylformamide (DMF) solution of the organic compound or polymer, e.g. carboxyl-substituted aminosilane. However, it was also found, and particularly noticeable at higher electrodeposition voltages, that there are two layers of coating; first is an electrovalent coating and then a field effect develops whereby the second layer goes on electrostatically. This layer can be rubbed off, but the first layer is tightly bound to the surface. In this respect it was noted that after the electrodeposition, and the coating was placed in DMF, followed by isopropyl alcohol, then DMF and finally isopropyl alcohol (5 minutes each), such treatment removed the second layer but did not dissolve the coating. Furthermore, placing the coated strips in water had no effect on removing the coating.

The nature and orientation of the bonding of the organic compound or polymer to the metal, e.g. aluminum surface, was established by Auger electron spectroscopy and multiple internal reflection infrared spectroscopy. The resulting coating on the metal substrate confers improved and strong adhesive bondability to the coated metal and also confers spot weldability to the metal substrate.

DETAILED DESCRIPTION OF THE INVENTION AND PREFERRED EMBODIMENTS

The metal substrates to be subject to electrodeposition according to the invention can be oxidized or deoxidized substrates. Thus the metal substrates can be initially subjected to either a non-deoxidizing cleaning or a deoxidizing cleaning, and either of such cleaning procedures can be utilized for electrodeposition of an organic coating according to the invention for enhancing adhesive bonding while permitting spot weldability, particularly by electrodeposition at low voltage.

An illustrative non-deoxidizing cleaning procedure includes treatment first with Chlorosolve, a mixture of dichloromethane and isopropyl alcohol, followed by treatment in an alkaline cleaner, and then treatment with hot deionized water, cold water, and then an isopropanol bath, followed by air drying.

An illustrative deoxidizing cleaning procedure includes treatment first with Chlorosolve, followed by treatment in an alkaline cleaner, a deionizing rinse, and then treatment with a deoxidizer such as Amchem 616, which is a formulation comprised of nitric acid, hydrofluoric acid and chromic acid, followed by rinsing in deionized water and then oven drying.

It will be understood that the above cleaning procedures are optional and form no part of the present invention.

In carrying out the electrodeposition procedure of the invention, the metal of the substrate to be coated should be "active", the term "active metal" being defined herein as an oxidizable metal which can react in the non-aqueous medium with the organic compound or polymer to form an organometallic compound. The organic compound or polymer should be of a type which has a labile hydrogen and can generate an anion. The evidence appears to show that the mechanism of electrodeposition, e.g. of carboxyl-aminosilane, is that the anion of the organic compound, either monomeric or polymeric, such as the carboxylate anion, acts on the active metal during electrolysis, and is neutralized by combining with the metal to form an organometallic compound. In the case of carboxyl-aminosilane as the organic compound, the silicon atom is farthest removed from the metal surface, as will be noted further hereinafter.

Examples of active metals which can be employed as the substrate according to the invention include metals from Group IB, including copper and silver, Group IIB, including for example zinc and cadmium, Groups IIIA and IIIB, including boron, aluminum, scandium and yttrium, Groups IVA and IVB, including lead, tin, silicon, germanium, titanium, and zirconium, Group VA, including antimony and bismuth, VB, such as vanadium, VIB, including chromium, molybdenum, and tungsten, and group VIII, including iron, cobalt and nickel.

Particularly important in connection with aircraft components are the metals aluminum, titanium, stainless steel, nickel, silver and copper.

Any organic compound can be used having a labile hydrogen, as noted above, and which causes the organic anion or moiety to migrate to the anode and deposit as a reaction product with the metal substrate, e.g. aluminum.

Examples of organic compounds utilized for providing the electro-deposited coating according to the invention, and having a labile hydrogen, are for example reaction products of the various anhydrides, for example phthalic, maleic, succinic, nonenylsuccinic, chlorendic, bemzophenone tetracarboxylic dianhydride, the styrene-maleic anhydride copolymer, and the methyl vinyl ether-maleic anhydride copolymer, or mixtures thereof, with an aminopropyl trialkoxysilane, as, for example, γ-aminopropyltriethoxysilane (Union Carbide's A 1100), N-Beta-(aminoethyl)-gamma-aminopropyltrimethoxysilane (A 1120), and gamma-mercaptopropyltrimethoxysilane (A 189.)

During the electrodeposition, as result of electrolytic conversion, as previously noted, the metal anode and the organic anion, e.g. ionic carboxyl anion, combine to form a chemical compound which is either electrovalently or covalently bonded.

In addition to the use of simple organic substituted aminosilanes, polymeric derivatives also can be employed. Thus, for example, poly (styrene/maleic anhydride) can be used, as well as a combination of simple organic and polymeric derivatives, e.g. a 1:1 mixture of the aminosilane (A1100) derivative of the poly (styrene/maleic anhydride) polymer, with the succinic anhydride/A1100 aminosilane derivative. Other suitable compounds and which do not contain silicon, include butylamine reaction products with phthalic anhydride, decylamine reaction products with phthalic anhydride, and carboxyl terminated butadieneacrylonitrile copolymer. Still other compounds include phenyl phosphonic acid, and dimethyl phosphite as their triethylamine salts, to yield organometallic compounds with the metal, e.g. aluminum. Still others include sulfonic acid compounds, such as, 4.4' - biphenyldisulfonic acid.

When employing alkoxy aminosilanes, it has been found that by hydrolyzing off the alkoxy group in hot or cold water following formation of the coating, a functional group such as the Si-OH group remains, which is capable of forming a chemical bond to an adhesive such as an epoxy. However, such treatment with water is not necessary, particularly with other organic compounds used to form electrodeposited coatings according to the invention.

One typical and preferred compound for electrodeposition according to the invention is that formed by the reaction of maleic anhydride and A 1100, as noted below:

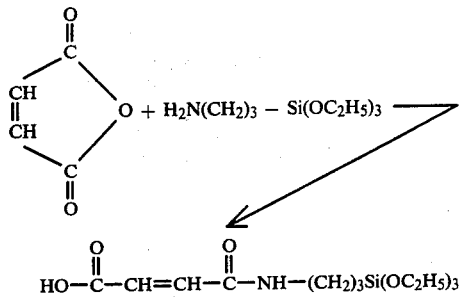

Electrolysis is carried out by immersing the metal substrate in a non-aqueous solvent solution of the organic compound or polymer with which the metal substrate is to be coated. Organic solvents for the electrodeposition solutions include, for example, dimethylformamide (DMF), N-methyl pyrollidone, tetrahydrofuran, ethylene glycol, chloroform, and mixtures thereof. The solvent should of course be inert with respect to the organic compound dissolved therein and which is to be coated on the metal substrate.

Tests show that the non-aqueous electrodeposition solutions employed according to the invention are stable over long periods of time.

The metal substrate, e.g. aluminum, is made the anode, the cathode being, for example, platinum. Either direct current or alternating current can be employed in the electrodeposition, preferably direct current. Electrolytic voltages employed can range from about 1 to as high as 300 volts, usually from about 1.7 to about 100 volts. Increasing the voltage substantially above 100 volts generally decreases adhesive bonding strength. Electrodeposition of the coating on the metal substrate takes place very rapidly, for example, within about 1 minute. After that time, current drops off markedly, indicating electrodeposition of the coating on the metal substrate.

When employing for example a carboxyl-substituted aminosilane formed by the reaction of maleic anhydride and A 1100, noted above, the carboxyl anion at one end of the molecule becomes chemically bonded to the aluminum substrate, and the silicon atom at the opposite end of the molecule is remote from the metal surface, as noted below.

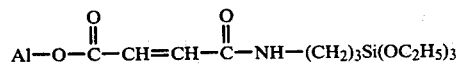

Such silicon atom sets up a hydrophobic barrier, to thereby enhance resistance to corrosion and humidity. However, as previously noted, the presence of silicon in the coating compound is not necessary.

In carrying out the electrodeposition according to the invention, it is particularly necessary that the electrodeposition reaction be carried out in non-aqueous media. Thus, in water the overriding reaction is for anodization to occur, rather than for the deposition of a strong chemically bonded coating on the metal substrate which occurs in non-aqueous solutions according to the invention, and which confers both enhanced adhesive bonding as well as spot weldability characteristics on the substrate.

Coating thickness of the electrodeposited coating according to the invention can range, e.g. from about 0.02 micron to about 100 microns.

The chemcially bonded coating formed on the metal substrate according to the invention, generally has functional groups attached thereto for bonding to an adhesive, such as hydroxyl, amide, nitrile and carboxyl groups. Adhesives which can be strongly bonded to metal substrates such as aluminum, via the electrodeposited coating according to the invention, include epoxy, polyimides, phenolics, and other adhesives.

The following are examples of practice of the invention:

EXAMPLE 1

A one inch wide strip of aluminum was immersed to a depth of one inch in an electrodeposition solution described below, between two platinum electrodes, each ⅜" wide, also immersed in the solution, and spaced about ⅜" from the front and back of the aluminum strip. The platinum cathodes were connected to each other so that they were of the same potential and allowed a uniform electrical field to exist across the solution.

The electrodeposition solution consisted of 0.1 mole of the coating reactant in the form of the reaction product of phthalic anhydride and A 1100, 400 milliliters (ml) DMF and 500 grams ethylene glycol and 10 grams triethylamine, per liter.

In preparing the solution, the anhydride is dissolved in the DMF and the aminosilane (A 1100) added to this and allowed to react at room temperature. Then the glycol and triethylamine are added. The glycol is added to enhance the dielectric constant of the medium so as to facilitate ionization of the charge carriers (the carboxyl anions). The addition of triethylamine results in a protonated amine which allows the carboxyl anion to form readily.

The samples were then electrolyzed using direct current at various voltages ranging from 1.5 to as high as 300 volts, most runs being made at from 1.5 to 100 volts for 5 minutes. This time limit was arbitrarily selected to merely allow the solution to reach a limiting low current value. At each voltage the current drop-off was quite rapid. Coatings were formed on all of the samples.

Following electrodeposition, the strips were washed in DMF, isopropyl alcohol, DMF, and finally in isopropyl alcohol again to thoroughly wash any loosely adhered material from the surface.

To establish the nature and orientation of bonding of the organic compound to the aluminum surface, Auger electron spectroscopy and multiple internal reflection infrared spectroscopy, were used.

The spectroscopic evidence appears to show that the mechanism of electrodeposition of the carboxyl-aminosilane involves reaction of the carboxylate anion with the active aluminum metal during electrolysis, to form a chemical bond.

EXAMPLE 2

The procedure of Example 1 was substantially followed for the electrodeposition of a coating on an aluminum substrate, employing an electrodeposition solution consisting of 7.9 grams phenyl phosphonic acid in 40 ml DMF, 50 grams ethylene glycol and 10 grams triethyl amine.

Two runs were made using a separate aluminum strip in each run, one of the runs being carried out using direct current at constant voltage of 50 volts, and the other at constant voltage of 100 volts. Current values were obtained at preselected time intervals during each run.

The following data were obtained for both runs:

TABLE 1

| Time (minutes) | Run 1 (50 volts) milliamps (mA) | Run 2 (100 volts) milliamps (mA) |
|---|---|---|
| 0 | 30.6 | 58.6 |
| 15 seconds | 17.6 | 40.7 |
| 1:00 | 6.9 | 27.4 |
| 2:00 | 2.5 | 19.3 |
| 4:00 | 0.7 | 9.7 |
| 5:00 | 0.6 | 6.9 |

Two similar runs were made employing an electrodeposition of essentially the same composition as noted above, except that the concentration of phenyl phosphonic acid was doubled. Such electrodeposition solution consisted of 15.8 grams phenyl phosphonic acid in 40 ml DMF, 50 grams ethylene glycol and 20 grams triethyl amine. The data for these two runs are set forth in Table 2 below:

TABLE 2

| Time (minutes) | Run 1 (50 volts) milliamps (mA) | Run 2 (100 volts) milliamps (mA) |
|---|---|---|
| 0 | 30.5 | 62.3 |
| 15 seconds | 19.7 | 41.1 |
| 1:00 | 9.7 | 24.5 |
| 2:00 | 2.9 | 16.2 |
| 4:00 | 0.8 | 7.6 |
| 5:00 | 0.6 | 5.1 |

It is seen that for both series of runs for which the data are given in Tables 1 and 2 above, the current dropped with increase in time of electrodeposition, showing the gradual electrodeposition of coating on the substrates over the electrodeposition period. These coatings were determined to be electrochemically bonded to the aluminum substrate by the spectroscopic means noted in Examle 1 above.

The increase in concentration of the organic coating material, as shown by a comparison of Tables 1 and 2, had relatively little effect on rate of deposition of the coatings as indicated by a comparison of current values at the respective time intervals for the respective runs at 50 volts, and at 100 volts.

EXAMPLE 3

Two series of electrodeposition runs similar to those set forth in Example 2 were carried out using direct current, each series comprised of two runs, one at constant voltage of 50 volts and the other at constant voltage of 100 volts as in the case of Example 2.

The first series of runs was carried out in an electrodeposition solution consisting of 5 grams succinic anhydride in 40 ml DMF, 50 grams ethylene glycol, 11.1 grams A 1100 and 5 grams triethyl amine.

The second series of runs was carried out at double the concentration of succinic anhydride, in an electrodeposition solution consisting of 10 grams succinic anhydride in 40 ml DMF, 50 grams ethylene glycol, 22.2 grams A 1100 and 10 grams triethyl amine.

The data for the first series of runs in the first electrodeposition solution are set forth in Table 3 below and the data for the second series of runs employing the second electrodeposition solution are set forth in Table 4 below. In each run current values were obtained at preselected time intervals.

TABLE 3

| Time (minutes) | Run 1 (50 volts) milliamps (mA) | Run 2 (100 volts) milliamps (mA) |
| --- | --- | --- |
| 0 | 31.1 | 63.1 |
| 15 seconds | 24.0 | 52.9 |
| 1:00 | 20.5 | 49.2 |
| 2:00 | 22.9 | 48.4 |
| 4:00 | 21.1 | 45.9 |
| 5:00 | 20.2 | 44.9 |

TABLE 4

| Time (minutes) | Run 1 (50 volts) milliamps (mA) | Run 2 (100 volts) milliamps (mA) |
| --- | --- | --- |
| 0 | 30.8 | 62.6 |
| 15 seconds | 26.0 | 55.8 |
| 1:00 | 23.1 | 51.5 |
| 2:00 | 24.0 | 50.4 |
| 4:00 | 23.6 | 49.8 |
| 5:00 | 23.0 | 49.6 |

As seen from the data in Tables 3 and 4 above, again in each run current decreased with time, indicating the gradual formation of electrodeposited coating with time at the constant voltage noted above for each run. Each of the samples for the four runs, following the electrodeposition period, contained a chemically bonded coating.

As in the case of Example 2 above, the increase in concentration of the organic coating material, as shown by a comparison of Tables 3 and 4, had relatively little effect on rate of deposition of the coatings as indicated by a comparison of current values at the respective time intervals for the respective runs at 50 volts, and at 100 volts.

EXAMPLE 4

Three runs were carried out using essentially the same procedure described in Example 1, the first run being carried out using as anode a stainless steel strip, the second run using a titanium strip and the third run using an Inconel 625 (nickel, chromium alloy) strip, and carrying out the electrodeposition with direct current at 50 volts constant voltage for each run.

The electrodeposition solution for each run consisted of 35 grams CTBN (carboxy terminated acrylonitrile-butadiene copolymer, 400 ml NMP (N-methyl pyrrolidone) and 500 grams ethylene glycol. Current at certain preselected intervals of time was measured during each run. The data for these three runs is set forth in Table 5 below.

TABLE 5

| Time (minutes) | Runs (mA) 1 (stainless steel) | 2 (titanium) | 3 Inconel$^{625}$ |
| --- | --- | --- | --- |
| 0 | 39.0 | 36.1 | 41.3 |
| 15 seconds | 35.7 | 28.0 | 37.9 |
| 1:00 | 35.6 | 30.4 | 37.8 |
| 2:00 | 34.6 | 34.0 | 37.3 |
| 4:00 | 32.5 | 31.9 | 35.6 |
| 5:00 | 31.7 | 31.0 | 34.4 |

In each case an electrodeposited coating was formed on the stainless steel, titanium and Inconel substrates, at the end of each run, as indicated by gradual reduction in current with time for each run, as shown in Table 5 above. The coatings formed on each of the substrates was determined by Auger electron spectroscopy and multiple internal reflection infrared spectroscopy to be chemically bonded to the respective substrates.

EXAMPLE 5

The procedure of Example 1 was essentially followed for electrodepositing an organic coating on an aluminum anode, the electrodeposition being carried out using alternating current at constant voltage of 50 volts.

The electrodeposition solution consisted of 9.8 grams maleic anhydride, 400 ml DMF, 22.2 grams A 1100, 10 grams triethyl amine and 500 grams ethylene glycol.

Current readings were taken at certain preselected time intervals and the data for this run is set forth in Table 6 below.

TABLE 6

| Time (minutes) | Current (mA) |
| --- | --- |
| 0 | 90.3 |
| 15 seconds | 65.8 |
| 1:00 | 42.3 |
| 2:00 | 36.4 |
| 4:00 | 27.6 |
| 5:00 | 25.3 |
| 10:00 | 22.1 |
| 25:00 | 21.7 |

It it seen from Table 6 above that during the period of electrodeposition, current dropped off gradually with increase in time, indicating formation of a coating.

The resulting coating electrodeposited in the manner noted above, was found to be chemically bonded to the aluminum substrate, as determined by procedure noted in Example 4 above.

EXAMPLE 6

The procedure of Example 1 was substantially followed for electrodeposition of an organic polymer on aluminum as substrate, employed as anode in the electrodeposition.

The electrodeposition solution consisted of 14 grams Arco polymer BD-R45HT (hydroxy-terminated polybutadiene), 0.98 grams maleic anhydride, 50 ml NMP, 37.5 ml chloroform and 1 gram triethyl amine.

Two runs were made using direct current, one at 1.7 volts and the other at 50 volts. Current readings were obtained at preselected time intervals during the electrodeposition in each run.

The data for these two runs are set forth in Table 7 below:

TABLE 7

| Time (minutes) | Run 1 (1.7 v) mA | Run 2 (50 v) mA |
| --- | --- | --- |
| 0 | 0.47 | 54.2 |
| 15 seconds | 0.34 | 25.4 |
| 1:00 | 0.20 | 5.62 |
| 2:00 | 0.12 | 1.89 |
| 4:00 | 0.055 | 0.72 |
| 5:00 | 0.043 | 0.58 |

As noted from Table 7 above, during electrodeposition, current decreased with increase in time, indicating increased thickness of coating formed during electrodeposition. The coating thus formed was determined to be chemically bonded to the aluminum substrate by procedure noted in Example 4 above.

EXAMPLE 7

The procedure of Example 1 was essentially followed for electrodeposition of organic coatings on three separate aluminum substrates in three separate runs at different constant voltages noted below.

The electrodeposition solution contained 20 grams Teracol 2,000 (hydroxy-terminated polytetrahydrofuran), 1.96 grams maleic anhydride, 100 ml NMP, 50 ml chloroform, 50 grams ethylene glycol and 2 grams triethyl amine.

The three runs were carried out employing direct current, one run at constant voltage of 1.7 volts, a second run at constant voltage of 50 volts and a third run at constant voltage of 100 volts. The current for each of these runs was obtained at preselected time intervals.

The data for these three runs are set forth in Table 8 below.

TABLE 8

| Time (minutes) | Run 1 (17 v) mA | Run 2 (50 v) mA | Run 3 (100 v) mA |
|---|---|---|---|
| 0 | 1.39 | 134.7 | 278 |
| 15 seconds | 0.60 | 22.9 | 75 |
| 1:00 | 0.17 | 2.7 | 18.5 |
| 2:00 | 0.067 | 1.21 | 8.54 |
| 4:00 | 0.032 | 0.70 | 5.11 |
| 5:00 | 0.026 | 0.68 | 4.56 |

As seen in Table 8 above, for each of runs 1, 2 and 3, current decreased with time during the electrodeposition period, indicating formation of increased thickness of coating with time. The resulting coatings were determined to be chemically bonded to the aluminum substrate by procedure noted in Example 4 above.

EXAMPLE 8

The procedure of Example 7 was essentially followed but employing as the electrodeposition solution a solution consisting of 2.2 grams hydroxypropyl cellulose, 0.98 grams maleic anhydride, 50 ml NMP, 50 grams ethylene glycol and 1 gram triethyl amine.

The data for the three electrodeposition runs on separate aluminum substrates are set forth in Table 9 below.

TABLE 9

| Time (minutes) | Run 1 (1.7 v) mA | Run 2 (50 v) mA | Run 3 (100 v) mA |
|---|---|---|---|
| 0 | 1.832 | 131.4 | 307 |
| 15 seconds | 0.736 | 27.2 | 40.4 |
| 1:00 | 0.286 | 4.48 | 12.55 |
| 2:00 | 0.139 | 1.54 | 6.42 |
| 4:00 | 0.073 | 0.69 | 2.26 |
| 5:00 | 0.047 | 0.59 | 1.59 |

It is seen from Table 9 above, that amperage for each of the three runs decreased with time, indicating gradual electrodeposition of a coating on the substrates. The resulting coatings on the aluminum substrates were determined by procedure noted in Example 4 to be chemically bonded to the substrate.

EXAMPLE 9

The procedure of Example 1 was substantially followed for electrodeposition of an organic coating on an aluminum substrate.

The electrodeposition solution consisted of 1.48 grams phthalic anhydride, 1.57 grams decyl amine, 50 grams ethylene glycol, 40 grams DMF and 1.01 grams triethylamine. Two aluminum strips were subjected to direct current electrodeposition, one at constant voltage of 50 volts and the other at constant voltage of 100 volts. The current for each run was determined at various time intervals. The data for these runs are set forth in Table 10 below.

TABLE 10

| Time (minutes) | Run 1 (50 v) mA | Run 2 (100 v) mA |
|---|---|---|
| 0 | 30.1 | 66 |
| 15 seconds | 20.5 | 53.2 |
| 1:00 | 10.6 | 44.3 |
| 2:00 | 6.15 | 38.4 |
| 4:00 | 2.39 | 30.7 |
| 5:00 | 1.475 | 27.7 |

An organic coating formed gradually during electrodeposition with time, as indicated by reduction in current with time in the above table, and the final organic coating on each of the aluminum substrates when examined by Auger spectroscopy showed the coating to be chemically bonded to the substrates.

EXAMPLE 10

The same procedure as noted above in Example 9 was followed, using the same electrodeposition solution except that in place of the ethylene glycol of the electrodeposition solution in Example 9, 50 grams of water were substituted. It was noticed that during electrodeposition of the aluminum substrate at 50 volts, light cathode gassing occurred, and during the electrodeposition of the aluminum substrate at 100 volts, more vigorous cathode gassing occurred.

The data for these runs is set forth in Table 11 below.

TABLE 11

| Time (minutes) | Run 1 (50 v) mA | Run 2 (100 v) mA |
|---|---|---|
| 0 | 35.6 | 72.9 |
| 15 seconds | 23.5 | 44.6 |
| 1:00 | 5.7 | 20.6 |
| 2:00 | 3.10 | 8.12 |
| 4:00 | 1.72 | 2.32 |
| 5:00 | 1.39 | 1.74 |

Following the 5 minute period of electrodeposition for each of the runs in this example, the samples were subjected to Auger electron spectroscopy, which indicated that no organic coating was formed. Rather, an oxide coating was formed on the aluminum substrate during electrodeposition, resulting in reduced current with lapse of time for each of the runs, as noted in Table 11 above.

The present example shows that where the electrodeposition is carried out in aqueous solution, an organic coating does not form on the substrate but rather an oxide coating, whereas when carried out in an organic non-aqueous solution, as in Example 9 above, according to the invention, an organic coating which is chemically bonded to the substrate is obtained.

EXAMPLE 11

Two pairs of strips of 2024 aluminum alloy were subjected to electrodeposition using direct current, one pair of the strips being treated at constant voltage of 1.7 volts and the other pair at constant voltage of 20 volts. The strips were each one inch wide by four inches in length and 0.040 inches thick, and one inch of the length of each strip was immersed in the electrodeposition solution, a one inch by one inch area of each strip thus being coated by electrodeposition.

The electrodeposition solution consisted of 10 grams succinic anhydride, 400 ml DMF, 22.2 grams A 1100, 10 grams triethyl amine and 500 grams ethylene glycol. The strips were each made the anode when immersed in the solution, with platinum electrodes as cathodes.

During electrodeposition of coating on each of the two aluminum strips of each pair, current readings were taken at preselected time intervals. The data for these two runs are set forth in Table 12 below.

TABLE 12

| Time (minutes) | Run 1 (1.7 v) mA | Run 2 (20 v) mA |
| --- | --- | --- |
| 0 | 1.93 | 66.2 |
| 15 seconds | .63 | 27.2 |
| 1:00 | .242 | 4.73 |
| 2:00 | .170 | 1.76 |
| 4:00 | .146 | .725 |
| 5:00 | .144 | .605 |

An organic coating formed gradually, the thickness of the coating increasing with time, as indicated by reduction in current with time in the above table, and the final organic coating on each of the aluminum substrates was chemically bonded to the substrates.

A third pair of strips of 2024 aluminum having the same dimensions as the strips noted above, were also immersed to a depth of one inch in an electrodeposition solution described below, using platinum electrodes, for electrodeposition of a coating thereon.

The electrodeposition solution consisted of 9.8 grams maleic anhydride, 400 ml DMF, 22.2 grams A 1100, 10 grams triethyl amine and 500 grams ethylene glycol.

This third run was carried out using direct current at a constant voltage of 20 volts and current readings were taken at certain preselected time intervals. The data for this run is set forth in Table 13 below.

TABLE 13

| Time (minutes) | Run 3 mA |
| --- | --- |
| 0 | 63.8 |
| 15 seconds | 32.9 |
| 1:00 | 12.0 |
| 2:00 | 5.36 |
| 4:00 | 2.44 |
| 5:00 | 1.99 |

The resulting coating electrodeposited in the manner noted above, was chemically bonded to the aluminum substrate.

Strips of 2024 aluminum of the same dimensions noted above and which were subjected to normal phosphoric acid anodizing were used as controls in adhesion tests with the three coated strips noted above. The control strips and the strips having a electrodeposited coating according to the invention, were bonded with FM73 (epoxy tape) adhesive in an autoclave at 40 psi and 240° F. for 90 minutes. In these tests each pair of strips coated in each of the three runs noted above were adhesively bonded together adjacent the electrodeposited coatings thereon. Pairs of control strips were similarly bonded together. The cured adhesively connected pairs of strips were then subjected to single lap shear tests.

The results of such tests are noted in Table 14 below.

TABLE 14

| Specimen Treatment | Single Lap Shear (psi) |
| --- | --- |
| Phosphoric anodized | 4503 |
| Phosphoric anodized | 4372 |
| Phosphoric anodized | 4516 |
| SA (1.7 volts) - Run 1 | 4895 |
| SA (20 volts) - Run 2 | 4873 |
| MA (20 volts) - Run 3 | 4895 |
| SA - succinic anhydride treated | |
| MA - maleic anhydride treated | |

It is seen from Table 14 above that the lap shear strengths of the maleic anhydride (MA) and succinic anhydride (SA)-treated and electrocoated strips were higher than for the phosphoric anodized samples, showing improved adhesion for the aluminum samples having an electrodeposited coating according to the invention.

EXAMPLE 12

Strips of 2024 aluminum, 0.040 inch thick were cleaned and given a standard spot-weld etch treatment, resulting in aluminum surfaces having a surface resistance of 5 to 25 micro ohms.

2024 aluminum strips as described in Example 11, having an electrodeposited coating at 1.7 volts and produced employing the maleic anhydride electrodeposition solution of example 11, had a surface resistance of between 200 and 300 micro ohms. The coated surfaces were prepared for spot-welding by removing the coating from one surface of a pair of such strips by sanding, then wiping with acetone. The coated surfaces on the opposite side of the two strips were placed in contact with each other.

Spot-welding of the control uncoated specimens and the previously coated specimens was carried out employing a 100 KVA, 3 phase dry disc rectifier type spot-welding machine and a standard welding schedule established as routine for 0.04 inch, 2024 aluminum. In the case of the coated specimens, the electrodes of the welding machine contacted the opposite uncoated surfaces of the pair of such strips in contact with each other.

The various specimens were then subjected to shear tests at the spot welds, and the data and results of these test are set forth in Table 15 below.

TABLE 15

| Specimen No. | Uncoated Control (lb) | Maleic Aminosilane (lb) |
| --- | --- | --- |
| 1 | 760 | 750 |
| 2 | 740 | 750 |
| 3 | 690 | 700 |
| 4 | 720 | 700 |
| 5 | 780 | 800 |

From Table 15 above it is seen that the spot-weld shear values for the samples containing the electrodeposited coating from the solution containing maleic anhydride and aminosilane were comparable to those for the uncoated samples. Also, the nuggets of the weld for both the coated samples and the uncoated samples were not out of round nor were there any "spits". This indicates that the weld for the coated as well as the uncoated samples was a clean good weld.

Strips containing the electrodeposited coating according to the invention can be stored for long periods before spot-welding and such strips are protected from corrosion and oxidation by the coating, whereas conventional uncoated strips cannot be stored because of surface oxidation, and must be immediately spot-welded following cleaning or pretreatment, because of oxidation of the surface which changes the surface resistance.

From the foregoing, it is seen that the invention provides procedure for applying an organic coating to a metal substrate such as aluminum, for producing a system or combination which enhances adhesive bonding of such metal substrate and which also permits spot welding of the substrate. Thus the present invention reduces and/or eliminates present manufacturing procedures required for making a bondable metal surface, as well as to obtain a metal surface which is not spot weldable. A particular advantage of the present invention is to produce a metal part or substrate having a chemically bonded organic coating, and which can be stored for indefinite periods of time, without concern as to whether it becomes oxidized, for example, to a point where it is not readily spot weldable, a problem according to present practice. When such coated part is needed, it can be removed from the shelf, and with no further treatment, can be used either for adhesive bonding or spot-welding.

While I have described particular embodiments of my invention for purposes of illustration, it will be understood that various changes and modifications within the spirit of the invention can be made and the invention is not to be taken as limited except by the scope of the appended claims.

What is claimed is:

1. A process for enhancing adhesive bonding of a metal substrate and permitting spot welding thereof, which comprises passing an electric current through a non-aqueous electrolyte in which a metal substrate is the anode, the metal of said substrate being active and capable of forming an organometallic compound, said electrolyte containing an organic compound selected from the classes consisting of (a) carboxyl substituted aminosilanes, (b) butylamine reaction products with phthalic anhydride, decylamine reaction products with phthalic anhydride, and carboxyl terminated butadiene-acrylonitrile copolymer, and (c) phenyl phosphonic acid, and dimethyl phosphite, as their triethylamine salts, and sulfonic acid compounds.

2. The process as defined in claim 1, wherein said organic compound is a carboxyl substituted aminosilane.

3. The process as defined in claim 2, wherein said carboxyl substituted aminosilane is the reaction product of an anhydride and an aminosilane.

4. The process as defined in claim 3, wherein said anhydride is selected from the group consisting of phthalic, maleic, succinic, nonenylsuccinic and chlorendic anhydrides, benzophenone tetracarboxylic dianhydride, styrene-maleic anhydride copolymer and methyl vinyl ether-maleic anhydride copolymer, and mixtures thereof.

5. The process as defined in claim 4, wherein said aminosilane is an aminopropyl trialkoxysilane.

6. The process as defined in claim 4, wherein said aminosilane is selected from the group consisting of gamma-aminopropyltriethoxysilane, N-beta-(aminoethyl)-gamma-aminopropyltrimethoxysilane and gamma-mercaptopropyltrimethoxysilane.

7. The process as defined in claim 1, wherein said organic compound is selected from the group consisting essentially of butylamine reaction products with phthalic anhydride, decylamine reaction products with phthalic anhydride, and carboxyl terminated butadiene-acrylonitrile copolymer.

8. The process as defined in claim 1, wherein said organic compound is selected from the group consisting of phenyl phosphonic acid, and dimethyl phosphite, as their triethylamine salts, and sulfonic acid compounds.

9. The process as defined in claim 2, wherein said substrate is selected from the group consisting of aluminum, titanium, stainless steel, nickel, silver and copper.

10. The process as defined in claim 5, wherein said substrate is selected from the group consisting of aluminum, titanium, stainless steel, nickel, silver and copper, and said organic solvent is selected from the group consisting of dimethylformamide, N-methyl pyrrolidone, tetrahydrofuran, ethylene glycol, chloroform, and mixtures thereof.

11. The process as defined in claim 10, wherein said current is direct current, said voltage ranging from about 1.7 to about 100 volts, and wherein said electrodeposition is carried out for a period up to not more than about 5 minutes.

12. The process as defined in claim 11, wherein said substrate is aluminum.

13. The process as defined in claim 9, including applying an organic adhesive to said electrodeposited coating, on said substrate.

14. A metal substrate containing an organic electrodeposited coating which is chemically bonded to said substrate to enhance adhesive bonding and also permitting spot welding of said substrate, produced by the process of claim 2.

15. A metal substrate containing an organic electrodeposited coating which is chemically bonded to said substrate to enhance adhesive bonding and also permitting spot welding of said substrate, produced by the process of claim 3.

16. A metal substrate containing an organic electrodeposited coating which is chemically bonded to said substrate to enhance adhesive bonding and also permitting spot welding of said substrate, produced by the process of claim 6.

17. A metal substrate containing an organic electrodeposited coating which is chemically bonded to said substrate to enhance adhesive bonding and also permitting spot welding of said substrate, produced by the process of claim 10.

18. A metal substrate containing an organic electrodeposited coating which is chemically bonded to said substrate to enhance adhesive bonding and also permitting spot welding of said substrate, produced by the process of claim 11.

19. A metal substrate containing an organic electrodeposited coating which is chemically bonded to said substrate to enhance adhesive bonding and also permitting spot welding of said substrate, produced by the process of claim 12.

20. The process as defined in claim 1, wherein said substrate is selected from the group consisting of aluminum, titanium, stainless steel, nickel, silver and copper.

21. The process as defined in claim 20 wherein said organic solvent is selected from the group consisting of dimethylformamide, N-methyl pyrrolidone, tetrahydrofuran, ethylene glycol, chloroform, and mixtures thereof.

22. A metal substrate containing an organic electrodeposited coating which is chemically bonded to said substrate to enhance adhesive bonding and also permitting spot welding of said substrate, produced by the process of claim 1.

23. A process for enhancing adhesive bonding of a metal substrate and permitting spot welding thereof, which comprises passing an electric current through a non-aqueous electrolyte in which a metal substrate is the anode, the metal of said substrate being active and capable of forming an organometallic compound, said electrolyte containing an organic compound having a labile hydrogen, and capable of generating an anion during electrolysis, and an inert organic solvent for said compound, and electrodepositing a coating of said compound on said metal substrate wherein said anion is reacted with and is chemically bonded to the metal of said substrate.

24. The process as defined in claim 23, wherein said substrate is selected from the group consisting of aluminum, titanium, stainless steel, nickel, silver and copper.

25. The process as defined in claim 23, wherein said organic solvent is selected from the group consisting of dimethylformamide, N-methyl pyrrolidone, tetrahydrofuran, ethylene glycol, chloroform, and mixtures thereof.

26. The process as defined in claim 23, wherein said current is direct current or alternating current.

27. The process as defined in claim 23, wherein said electrodeposition is carried out at voltage ranging from about 1 to about 300 volts.

28. The process as defined in claim 27, wherein said electrodeposition is carried out for a period up to not more than about 5 minutes.

29. The process as defined in claim 24, wherein said electrodeposition is carried out at voltage ranging from about 1 to about 300 volts.

30. The process as defined in claim 23, including applying an organic adhesive to said electrodeposited coating, on said substrate.

31. The process as defined in claim 30, wherein said adhesive is an epoxy adhesive.

32. A metal substrate containing an organic electrodeposited coating which is chemically bonded to said substrate to enhance adhesive bonding and also permitting spot welding of said substrate, produced by the process of claim 23.

* * * * *